(12) United States Patent
Narayanaswamy et al.

(10) Patent No.: US 12,175,763 B2
(45) Date of Patent: Dec. 24, 2024

(54) DETERMINING A TRAILER ORIENTATION

(71) Applicant: Connaught Electronics Ltd., Tuam (IE)

(72) Inventors: Poornima Narayanaswamy, Tuam (IE); Naveen Kuruba, Tuam (IE)

(73) Assignee: CONNAUGHT ELECTRONICS Ltd., Tuam (IE)

( * ) Notice: Subject to any disclaimer, the term of this patent is extended or adjusted under 35 U.S.C. 154(b) by 0 days.

(21) Appl. No.: 17/766,952

(22) PCT Filed: Oct. 1, 2020

(86) PCT No.: PCT/EP2020/077479
§ 371 (c)(1),
(2) Date: Apr. 6, 2022

(87) PCT Pub. No.: WO2021/069289
PCT Pub. Date: Apr. 15, 2021

(65) Prior Publication Data
US 2024/0087329 A1    Mar. 14, 2024

(30) Foreign Application Priority Data

Oct. 11, 2019 (DE) ................ 10 2019 127 478.8

(51) Int. Cl.
*G06V 20/56* (2022.01)
*B60R 1/26* (2022.01)
*G06T 7/73* (2017.01)

(52) U.S. Cl.
CPC ............... *G06V 20/56* (2022.01); *G06T 7/74* (2017.01); *B60R 1/26* (2022.01); *G06T 2207/20021* (2013.01); *G06T 2207/30252* (2013.01)

(58) Field of Classification Search
CPC ........ G06V 20/56; G06V 10/255; G06T 7/74; G06T 2207/20021; G06T 2207/30252; G06T 7/73; B60R 1/26
See application file for complete search history.

(56) References Cited

U.S. PATENT DOCUMENTS 5,901,252 A * 5/1999 Kawakami ........... G06V 10/449
382/293
2019/0166338 A1 * 5/2019 Greenwood ........... G03B 29/00

FOREIGN PATENT DOCUMENTS

| DE | 10 2004 050149 A1 | 4/2006 |
| DE | 10 2011 113197 A1 | 3/2013 |
| DE | 10 2017 100669 A1 | 7/2018 |
| DE | 10 2017 106152 A1 | 9/2018 |

(Continued)

OTHER PUBLICATIONS

English Translation of DE102011113197A1 (Haja et al). (US version) (Year: 2011).*

(Continued)

*Primary Examiner* — Farzana Hossain
(74) *Attorney, Agent, or Firm* — Osha Bergman Watanabe & Burton LLP

(57) ABSTRACT

According to a method for determining a trailer orientation, an image (13) depicting a component (14) of the trailer (12) is generated by means of a camera system (15). Predetermined first and second reference structures (16, 18) are identified based on the image (13). The trailer orientation is determined by means of a computing unit (17) depending on the reference structures (16, 18).

9 Claims, 3 Drawing Sheets

(56) References Cited

FOREIGN PATENT DOCUMENTS

| | | |
|---|---|---|
| DE | 10 2018 203203 A1 | 9/2019 |
| DE | 10 2018 204981 A1 | 10/2019 |
| EP | 1593552 A1 | 11/2005 |
| JP | 2002-068032 A | 3/2002 |
| JP | 2006-256544 A | 9/2006 |
| JP | 2019-509204 A | 4/2019 |
| WO | 2012/103193 A1 | 8/2012 |
| WO | 2018/153915 A1 | 8/2018 |

OTHER PUBLICATIONS

English Translation of DE102011113197A1 (Haja et al.) (Espacenet with paragraph numbers) (Year: 2011).*
English Translation of DE 102017106152 (Espacenet with paragraph numbers (Year: 2017).*
Notification of Reason for Rejection in corresponding Japanese Application No. 2022-521408, dated Mar. 24, 2023 (7 pages).
Office Action issued in corresponding Japanese Patent Application No. JP 2022-521408 mailed Oct. 3, 2023 (9 pages).
International Search Report and Written Opinion issued in corresponding International Patent Application No. PCT/EP2020/077479, mailed on Jan. 12, 2021 (12 pages).
Search Report issued in corresponding German Patent Application No. 10 2019 127 478.8, mailed on May 19, 2020 (5 pages).

* cited by examiner

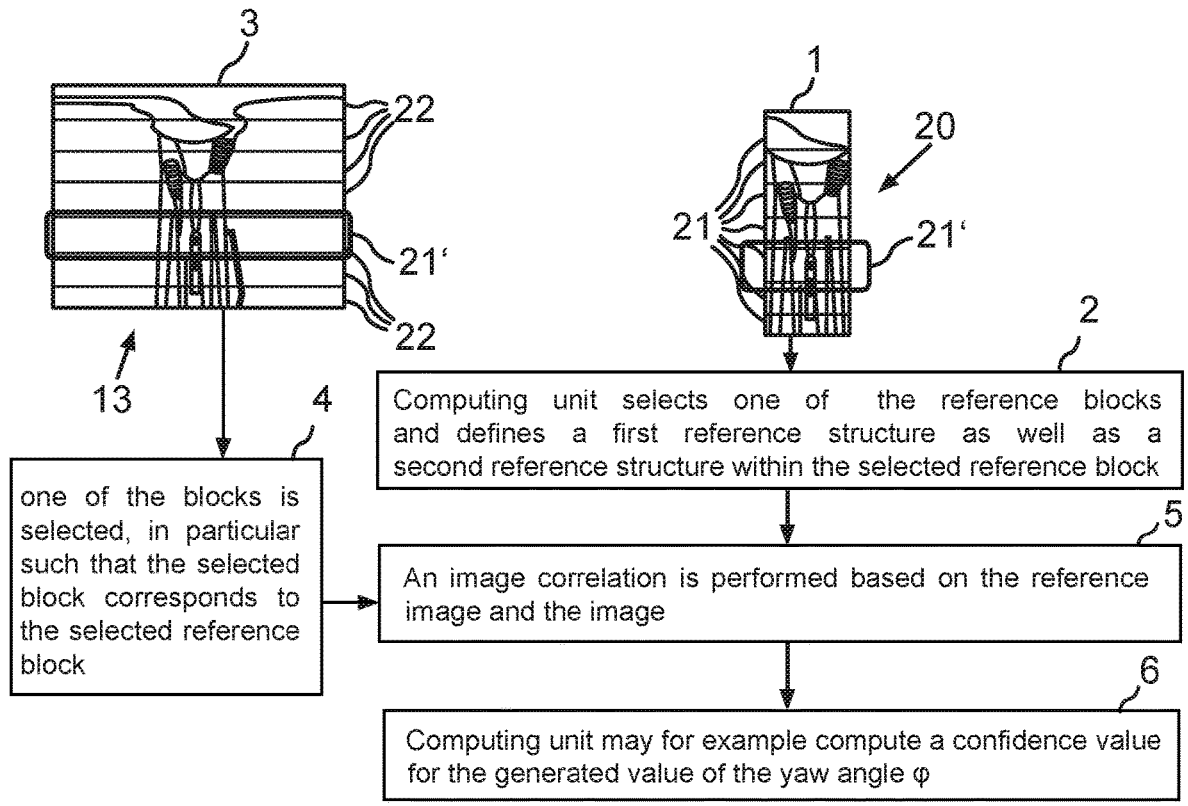
Fig. 3
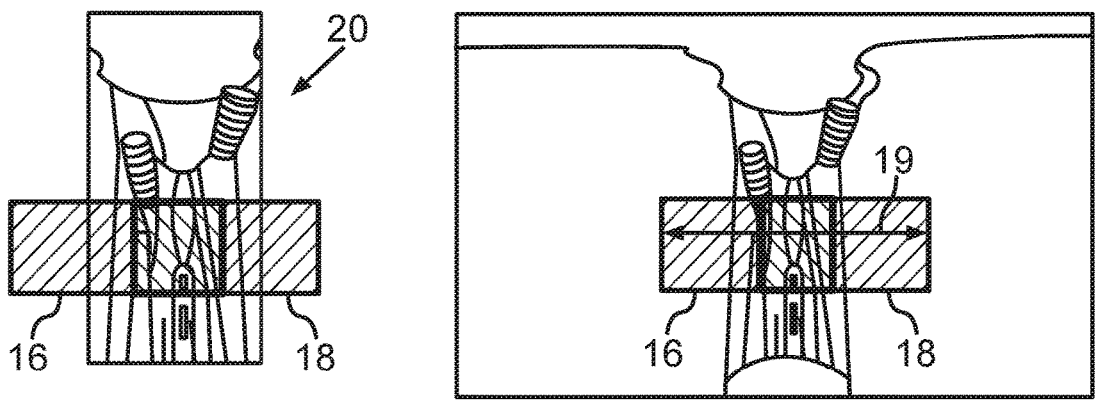
Fig. 4
Fig. 5

DETERMINING A TRAILER ORIENTATION

TECHNICAL FIELD

The present invention relates to a method for determining a trailer orientation with respect to a towing vehicle. The method comprises generating an image depicting a component of the trailer by means of a camera system of the vehicle and identifying a predetermined first reference structure based on the image by means of a computing unit of the vehicle.

The invention also relates to a corresponding electronic vehicle guidance system, a motor vehicle and a computer program.

Driver assistance functions or vehicle guidance functions may make use of a determined trailer orientation with respect to a towing vehicle, for example for backing assist or collision warning.

BACKGROUND OF THE INVENTION

In document WO 2018/153915 A1, a method for determining an angular position of a trailer is described. Therein, a raw image of a part of the trailer is obtained by means of a rear camera of the towing vehicle. Depending on texture values of the image, the angle orientation is determined.

When determining the orientation or angular position of the trailer with respect to the towing vehicle, in particular a yaw angle, the accuracy or applicability of the respective method may be limited by pitch angle variations of the trailer with respect to the vehicle. In particular, in camera-based approaches, the camera image may be distorted by the varying pitch angle.

BRIEF SUMMARY OF THE INVENTION

It is therefore an object of the present invention to provide an improved concept for determining a trailer orientation with respect to a towing vehicle to improve accuracy or reliability of the determination.

This object is solved by the subject-matter of the independent claims. Further implementations and embodiments are subject-matter of the dependent claims.

The improved concept is based on the idea to identify two predetermined reference structures in a camera image and to determine the trailer orientation based on respective positions of the two reference structures.

According to a first independent aspect of the improved concept, a method for determining a trailer orientation, in particular a yaw angle of the trailer, with respect to a towing vehicle is provided. According to the method, an image is generated by means of a camera system of the vehicle, the image depicting a component of the trailer. A predetermined first reference structure is identified based on the image by means of a computing unit of the vehicle. A predetermined second reference structure is identified by means of the computing unit based on the image. The trailer orientation is determined by means of the computing unit depending on a first position of the first reference structure and a second position of the second reference structure.

The image can be understood as image data generated by the camera system or as data generated based on the image data, for example by means of the computing unit or a further computing unit.

In other words, generating the image by means of the camera can be understood such that it involves using the camera system but is not necessarily restricted to using only the camera system. For example, a raw image may be generated by the camera system and image correction or image processing steps may be performed on the raw data or raw image to obtain the image by means of the computing unit or the further computing unit.

The towing vehicle, which is also denoted as vehicle, and the trailer are connected to each other, in particular such that the trailer can rotate with respect to the connection point.

The trailer orientation can be understood as an orientation of the trailer, in particular as an angular position of the trailer.

The component of the trailer may be any part of the trailer suitable for being identified in the image, for example by a template matching algorithm. The component may for example be given by or comprise a tow bar or a tongue of the trailer.

The first and the second reference structure comprise at least a respective part of the component of the trailer.

The first and the second reference structure may for example be predetermined based on one or more respective reference images taken for example by means of the camera system.

Identifying the first or second reference structure can for example comprise confirming that the respective reference structure is actually present in the image, for example with a confidence value being equal to or greater than a predetermined threshold value. Identifying the reference structures may also comprise determining the respective positions of the reference structures in the image.

In particular, the first and second position of the reference structures correspond to respective positions in the image. In particular, the positions are not necessarily given by absolute coordinates with respect to an environment of the vehicle or trailer.

By means of the method according to the improved concept, two independent reference structures are taken into account to determine the trailer orientation. In particular, a distance between the two reference structures may be taken into account or other relative information may be used. Therefore, variations of the component's extension or width within the image due to pitch angle variations, which may otherwise limit the possibility for template matching for determining the trailer orientation, may be compensated, since relative information regarding the reference structures may be used, not only absolute information regarding one reference structure. Additionally, when using two independent reference structures, size variations of the component within the image due to pitch angle variations may be less significant compared to considering only one reference structure.

Therefore, the method according to the improved concept may be applied in a broader range of scenarios including such, when the pitch angle of the trailer with respect to the vehicle varies or the pitch angle variations are significantly large. Therefore, the reliability of the determination of the orientation and the resulting accuracy of the determined orientation are improved.

The yaw and pitch angle of the trailer with respect to the vehicle may for example be determined based on respective angles enclosed by a longitudinal axis of the vehicle and a longitudinal axis of the trailer.

According to several implementations of the method, the trailer orientation is determined by means of the computing unit depending on a distance between the first position and the second position.

In case of a positive pitch angle between the vehicle and the trailer, the component of the trailer and therefore the reference structures are closer to the camera system and thus appear larger in the image compared to zero pitch angle. On the other hand, for negative pitch angles the component and therefore the reference structures are further away from the vehicle and appear smaller in the image.

Therefore, the distance between the first and second position of the first and second reference structure, respectively, provides a measure for the pitch angle, which may be used for transforming or virtually transforming the image depending on the pitch angle. Therefore, a higher accuracy of the determination of the trailer orientation may be achieved.

The longitudinal axis of the vehicle may for example correspond to a direction the vehicle may drive in case of a zero steering angle or a neutral steering position of the vehicle. The longitudinal axis of the trailer may for example correspond to a driving direction of the trailer when towed by the vehicle continuously driving with zero steering angle. The longitudinal direction of the trailer may for example correspond to an orientation or longitudinal direction of the component, for example of the tow bar or tongue of the trailer.

In particular, for zero pitch angle and zero yaw angle, the longitudinal axes of the vehicle and the trailer may be identical or parallel to each other. Considering the point of connection between the trailer and the vehicle as origin of a coordinate system and assuming the vehicle position being unchanged, the yaw and pitch angle may be defined according to a polar angle and azimuthal angle, respectively, of the longitudinal axis of the trailer in the coordinate system. In particular, the pitch angle may be defined as the negative polar angle and the yaw angle may be defined as azimuthal angle.

According to several implementations, the yaw angle of the trailer with respect to the vehicle is determined, in particular as the trailer orientation, by means of the computing unit depending of the first and the second reference structure.

In particular, the relative information obtained in form of the first and the second reference structure, for example a distance between the positions of the reference structure, may be used to compensate errors in the yaw angle determination or estimation.

For example, the yaw angle may be determined based on an edge detection in the reference structures and determining an orientation of the edges. To this end, a template matching algorithm may be used.

The determined yaw angle can then for example be used for safety information, for example for warning a driver of the vehicle in case of a potential collision of the trailer with the vehicle.

For example, the yaw angle can be used for or by an electronic vehicle guidance system, for example for a backing assist function or a collision warning function.

According to several implementations, the yaw angle is determined by means of the computing unit depending on the first and the second position, in particular depending on the distance between the positions.

According to several implementations, a reference image depicting the component of the trailer is generated by means of the camera system and the first and the second reference structure are defined based on the reference image by means of the computing unit. In particular, the steps of generating the reference image and defining the reference structures are performed prior to generating the image and identifying the reference structures in the image.

Defining the reference structures based on the reference image may be understood as predetermining the reference structures.

The steps of generating the reference image and defining the reference structures may for example be performed once for a given combination of trailer and vehicle and then may be used continuously or repeatedly for identifying the reference structures within the image during a normal operation of the combination. In particular, the reference structures and therefore the component of the trailer may be tracked or monitored based on the reference structures defined by means of the reference image.

In this way, a target-less tracking of the trailer component is possible. Target-less tracking may for example be understood such that it is not necessary to provide a dedicated reference pattern, for example a sticker, on the trailer to be tracked in order to determine the orientation. Rather, according to the improved concept, the reference structures are inherently defined by depicting the component as a reference image.

The improved concept is suitable and particularly beneficial for target-less trailer tracking applications, since the exact appearance of the reference structures is not known prior to the definition of the reference structures in contrast to, for example, a reference pattern given by a sticker on the trailer. Therefore, pitch angle variations may influence the target-less trailer tracking more significantly. Consequently, the compensation of the pitch angle variations by means of the improved concept is particularly beneficial.

According to several implementations, the reference image is partitioned or divided into two or more reference blocks and one of the reference blocks is selected by means of the computing unit. The first and the second reference structure are defined based on the selected reference block by means of the computing unit.

The reference structures being defined based on the selected reference block can be understood such that both reference structures lie within the reference block.

The position of the reference blocks and in particular the position of the selected reference block may be stored.

By selecting the reference block and defining the reference structures within the reference block, less complex tracking algorithms or template matching algorithms may be used and a smaller amount of data may have to be tracked.

According to several implementations, the reference blocks correspond to stripes within the reference image, in particular to horizontal stripes.

According to several implementations, the image is partitioned or divided into blocks and one of the blocks is selected by means of the computing unit. The first and the second reference structure are identified based on the selected block by means of the computing unit.

The reference structures being identified based on the selected block may be understood such that both reference structures lie at least partially within the selected block.

The selection of the block may for example be such that the selected block in the image corresponds to the selected reference block of the reference image. The selection of the block may for example be performed based on the stored position of the reference block.

According to several implementations, the image and the reference image are correlated by means of the computing unit and the first and the second position are determined by means of the computing unit based on the result of the correlation. The correlation may in particular correspond to a cross correlation.

Correlating the reference image and the image can be for example understood such that the respective data sets of the image and the reference image are correlated. For example, spatially dependent correlation values are computed, for example by means of respective correlation integrals.

By means of the correlation, similar parts within the image and the reference image may be identified. In particular, the correlation values may represent respective measures of similarity of respective spatial portions in the image and the reference image. Therefore, by means of the correlation, the reference structures may be recognized within the image.

According to several implementations, the first and the second reference structure are defined by means of the computing unit such that they overlap in the reference image.

Therefore, a component of the trailer that is being tracked may for example be a relatively small object, such as the tow bar of the trailer.

According to several implementations, a raw image depicting the component of the trailer is generated by means of the camera system and a polar transform of the raw image is generated to generate the image.

In particular, the polar transform may be performed by means of the computing unit or the further computing unit, wherein the further computing unit may for example comprised by the camera system.

For generating the polar transform of the raw image, in particular a polar view of the raw image is generated.

By means of considering the polar transform of the raw image, an enhanced level of detail may be achieved in the most relevant portions of the image, for example near the point of rotation of the trailer.

According to several implementations, a raw reference image is generated by means of the camera system, the raw reference image depicting the component of the trailer. A polar transform of the raw reference image is generated to generate the reference image.

According to several implementations, the image is generated by means of the camera system, such that it depicts a tow bar of the trailer as the component of the trailer.

Due to its shape, in particular due to its orientation corresponding or approximately corresponding to the longitudinal axis of the trailer, the tow bar may provide particularly suitable or meaningful information regarding the orientation, in particular the yaw angle.

According to several implementations, the component of the trailer comprises the tow bar of the trailer.

According to a further independent aspect of the improved concept, an electronic vehicle guidance system for a combination of a trailer and a towing vehicle is provided. The electronic vehicle guidance system comprises a computing unit configured to be coupled to a camera system of the vehicle for receiving an image depicting a component of the trailer. The computing unit is configured to identify a predetermined first reference structure based on the image. The computing unit is further configured to identify a predetermined second reference structure based on the image. The computing unit is configured to determine a trailer orientation with respect to the vehicle depending on a first position of the first reference structure and on a second position of the second reference structure.

An electronic vehicle guidance system may be understood as an electronic system, configured to guide a vehicle fully automatically or fully autonomously, in particular without an operation or intervention by a driver in the vehicle control. The vehicle conducts required steering actions, braking actions and/or acceleration actions automatically. In particular, the electronic vehicle guidance system may implement a fully automatic or fully autonomous driving mode according to SAE J3016. An electronic vehicle guidance system may also be understood as an advanced driver assistance system, ADAS, assisting a driver at partially automatic or partially autonomous driving. In particular, the electronic vehicle guidance system may implement a partly automatic or partly autonomous driving mode according to levels 1 to 4 of the SAE J3016 classification. Here and in the following, SAE J3016 refers to the respective standard dated June 2018.

According to several implementations of the electronic vehicle guidance system, the electronic vehicle guidance system comprises the camera system and the camera system comprises a rear camera or a rear-view camera mounted on the vehicle, in particular mounted on a rear side of the vehicle.

The rear side of the vehicle is in particular a side of the vehicle facing the trailer.

Modern vehicles may comprise rear-view cameras for multiple applications, other than determining the trailer orientation, in particular for applications regarding the vehicle without the trailer being attached. For example, the rear-view camera may be used for parking assist functions. Therefore, the electronic vehicle guidance system according to the improved concept may use an already existing camera system, which reduces space requirements and costs.

Further implementations of the electronic vehicle guidance system follow directly from the various implementations of the method according to the improved concept and vice versa. In particular, an electronic vehicle guidance system according to the improved concept may be designed or programmed to perform a method according to the improved concept or the electronic vehicle guidance system performs a method according to the improved concept.

According to a further independent aspect of the improved concept, a motor vehicle comprising an electronic vehicle guidance system according to the improved concept is provided.

According to a further independent aspect of the improved concept, a computer program comprising instructions is provided. The instructions cause the computer system to perform a method according to the improved concept, when the computer program is executed by a computer system, in particular by a computer system of an electronic vehicle guidance system according to the improved concept. Therein, the computer system of the electronic vehicle guidance system according to the improved concept may be given by the computing unit of the electronic vehicle guidance system.

According to a further independent aspect of the improved concept, a computer readable storage medium comprising a computer program according to the improved concept is provided.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are to be considered as disclosed, in particular by the implementations set out above, which extend beyond or deviate from the feature combinations set out in the relations of the claims.

BRIEF DESCRIPTION OF THE DRAWINGS

In the figures

FIG. 3 shows a flow diagram of an exemplary implementation of a method according to the improved concept;

FIG. 4 shows an example of a reference image for use according to the improved concept;

FIG. 5 shows an example of an image for use according to the improved concept.

DETAILED DESCRIPTION OF THE INVENTION

Figure 1:
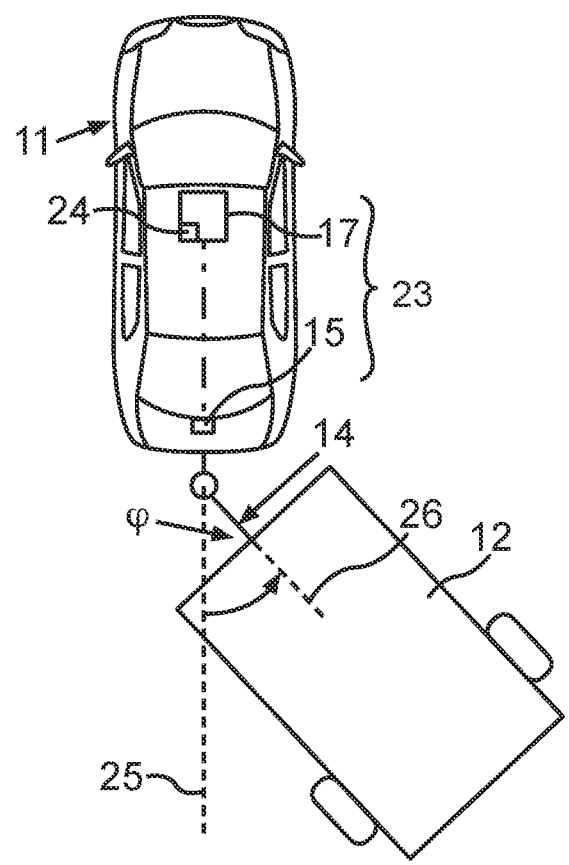
FIG. 1 shows a top view of a combination of a vehicle and a trailer comprising an exemplary implementation of an electronic vehicle guidance system according to the improved concept.

FIG. 1 shows an exemplary implementation of an electronic vehicle guidance system 23 comprised by a vehicle 11. A trailer 12 is connected to the vehicle 11, for example to a tow ball of the vehicle 11, by means of tow bar 14 of the trailer 12.

A longitudinal axis 25 of the vehicle 11 includes a yaw angle q with the longitudinal axis 26 of the trailer.

The vehicle guidance system 23 comprises a computing unit 17 and a rear-view camera 15 mounted on a rear side of the vehicle 11 and connected to the computing unit 17.

Optionally, the vehicle 11, for example the computing unit 17, may comprise a computer readable storage medium 24 according to the improved concept storing a computer program according to the improved concept. The computing unit 17 can for example access the storage medium 24 to execute the computer program. In this way, the vehicle guidance system 23 is caused to perform a method according to the improved concept.

Figure 2:
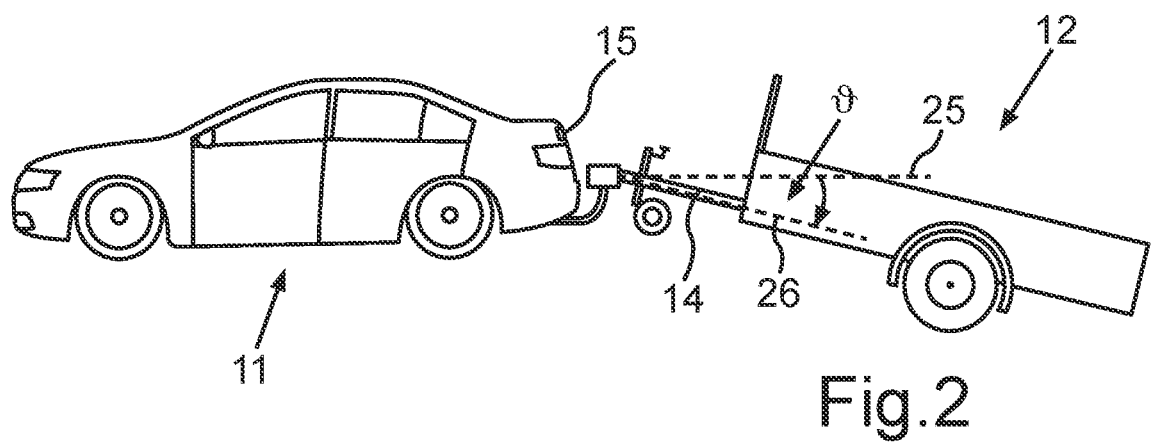
FIG. 2 shows a side view of the combination of FIG. 1.

In FIG. 2 the combination comprising the vehicle 11 and the trailer 12 of FIG. 1 is depicted in a side view.

The longitudinal axes 25, 26 include a pitch angle 9. The pitch angle 9 may for example be defined such that it is zero when the longitudinal axes 25, 26 correspond to each other or are parallel to each other. Furthermore, the pitch angle 9 may be for example defined to be positive, when the longitudinal axis 26 of the trailer is tilted towards the rear-view camera 15 and negative when it is tilted away from the rear-view camera 15.

The operation and function of the electronic vehicle guidance system 23 as in FIG. 1 and FIG. 2 is described in more detail with respect to exemplary implementations of a method according to the improved concept with respect to FIG. 3 to FIG. 6.

FIG. 3 shows a schematic flow diagram of an exemplary implementation of a method according to the improved concept.

In step 1 of the method, a reference image 20 is generated by the rear-view camera 15. The reference image 20 may for example be partitioned into reference blocks 21 by the computing unit 17, the reference blocks 21 corresponding for example approximately to horizontal stripes within the reference image 20. In particular, the reference image 20 depicts the tow bar 14 or a part of the tow bar 14.

In step 2 of the method, the computing unit 17 selects one of the reference blocks 21' and defines a first reference structure 16 as well as a second reference structure 18 within the selected reference block 21', as schematically shown in FIG. 4. Therein, the reference structures 16, 18 may for example correspond to overlapping regions within the selected reference block 21'. Generating the reference image 20 may for example comprise transforming a raw reference image into a polar view.

In particular, the reference image 20 may be generated at an instance wherein the yaw angle and the pitch angle $\varphi$, $\vartheta$ are both zero or approximately zero, for example with a predefined minimum confidence. Therein, the angles $\varphi$, $\vartheta$ being zero may for example be determined based on odometric measurements or estimations.

In step 3 of the method, an image 13 is generated by the rear-view camera 15. In particular, the image 13 is in general generated for non-zero yaw angle $\varphi$ and for zero or non-zero pitch angle $\vartheta$. Also the image 13 may for example be generated based on a raw image and a subsequent polar view transformation.

The image 13 is partitioned into blocks or horizontal stripes 22 analogous to the partitioning of the reference image 20 into reference blocks 21 in step 1. In particular, there may be a one-to-one correspondence between each of the blocks 22 and the respective reference block 21.

In step 4 of the method, one of the blocks 22' is selected, in particular such that the selected block 21' corresponds to the selected reference block 21'.

In step 5 of the method, an image correlation is performed based on the reference image 20 and the image 13. In particular, image data corresponding to the selected reference block 21' and the selected block 22' are correlated with respect to each other. By means of the correlation, a template matching may be performed, wherein a region in the selected block 22' corresponding to the first reference structure 16 is matched to a corresponding region in the selected reference block 21' as depicted schematically in FIG. 5. Analogously, a respective region in the selected block 22' corresponding to the second reference structure 18 is matched to a corresponding region in the selected reference block 21'.

By taking into account two independent reference structures 16, 18 for the template matching, the pitch angle 9 may be compensated for example when calculating or estimating a value for the yaw angle q.

In particular, the computing unit 17 computes in step 5 of the method a value for the yaw angle $\varphi$ depending on the result of the template matching or the correlation taking into account respective positions or differences in positions 19 between the reference structures 16, 18.

Figure 6:
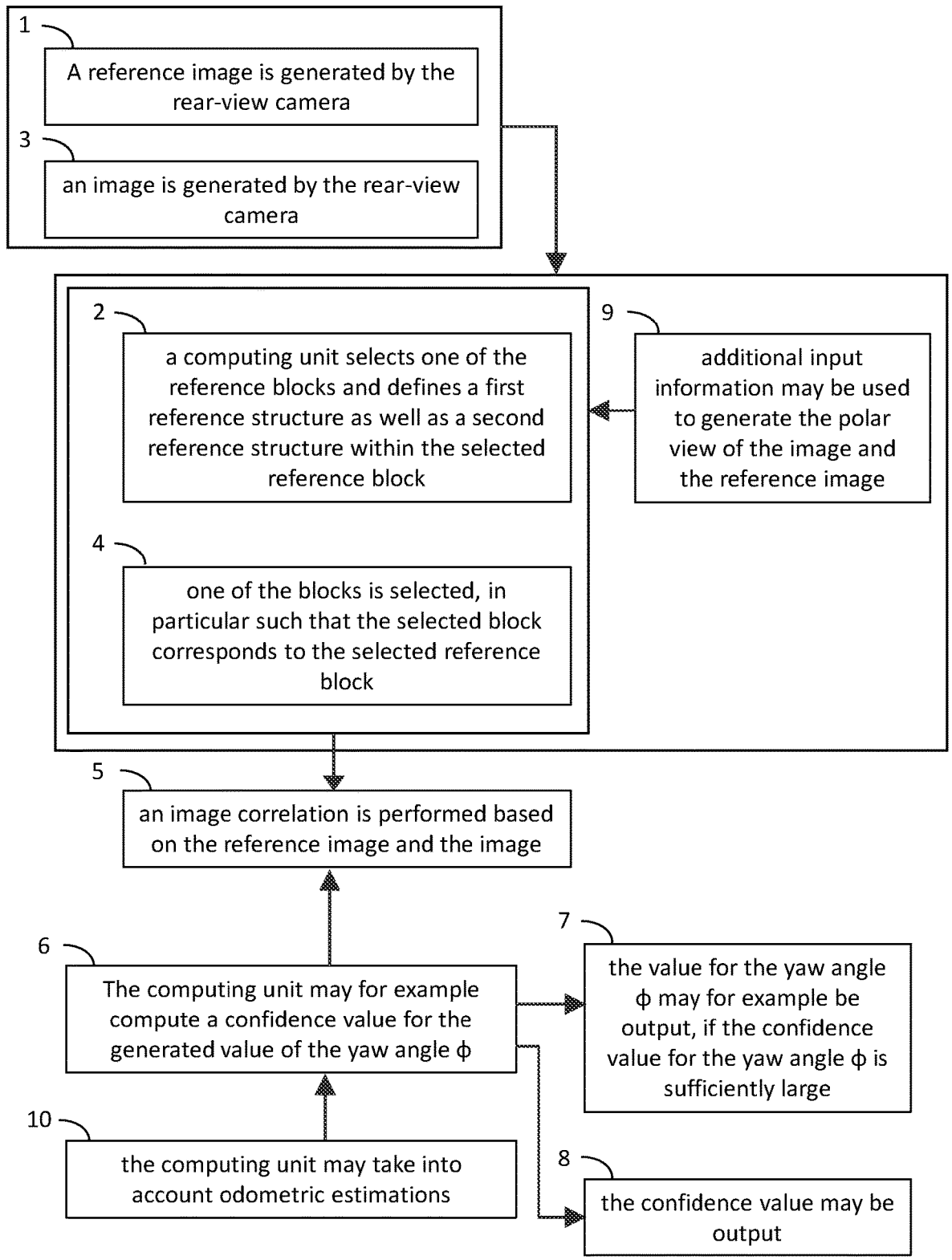
FIG. 6 shows a flow diagram of a further exemplary implementation of a method according to the improved concept.

FIG. 6 shows a schematic flow diagram of a further exemplary implementation of a method according to the improved concept, wherein the method is based on the method as depicted in FIG. 3. In particular, steps 1 to 5 of FIG. 6 correspond to steps 1 to 5 as described with respect to FIG. 3.

In step 6 of the method, the computing unit 17 may for example compute a confidence value for the generated value of the yaw angle $\varphi$. Optionally, the computing unit 17 may in step 10 take into account odometric estimations, for example based on odometry signals including information regarding a travelled distance of the vehicle, a vehicle velocity and/or a vehicle steering angle sequence to generate one or more reference value for the yaw angle φ. The confidence value may for example be determined based on the one or more reference values for the yaw angle φ.

In step 7, the value for the yaw angle φ may for example be output, if the confidence value for the yaw angle φ is sufficiently large, meaning that it is equal to or greater than a predetermined minimum confidence value. In step 8 of the method, the confidence value may be output.

The output values for the yaw angle φ and the respective confidence value may be used for a collision warning function or a backing assist function or other functionalities of the vehicle guidance system 23.

In optional step 9 of the method, additional input information including, for example, a length of the tow bar, a tow ball position and/or camera calibration data for the rear-view camera 15 may be used to generate the polar view of the image 13 and the reference image 20.

According to the improved concept, the trailer orientation may be determined with improved accuracy due to the possibility of compensating for pitch angle variations. In case a target-less trailer tracking, the improved concept may be particularly beneficial. By a respective image correlation according several implementations, the performance of the orientation detection is enhanced. The correlation step performance is made more robust to changes in pitch angle.

The invention claimed is:

1. A method for determining a trailer orientation with respect to a towing vehicle, the method comprising:
    generating an image depicting a component of a trailer by a camera system of the vehicle; and
    identifying a predetermined first reference structure based on the image by a computing unit of the vehicle,
    identifying a predetermined second reference structure based on the image by the computing unit;
    determining the trailer orientation by the computing unit depending on a first position of the first reference structure and a second position of the second reference structure;
    wherein a reference image depicting the component of the trailer is generated by the camera system; and the first and the second reference structure are defined based on the reference image by the computing unit; and
    wherein the reference image is partitioned into reference blocks and one of the reference blocks is selected by the computing unit, and the first and the second reference structure are defined based on the selected reference block by the computing unit.

2. The method according to claim 1, wherein the trailer orientation is determined by means of the computing unit depending on a distance between the first position and the second position.

3. The method according to claim 1, wherein a yaw angle of the trailer is determined by the computing unit depending on the first and the second reference structure.

4. The method according to claim 3, wherein the yaw angle is determined by means of the computing unit depending on the first and the second position.

5. The method according to claim 1, wherein the image is partitioned into blocks and one of the blocks is selected by the computing unit, and the first and the second reference structure are identified based on the selected block by the computing unit.

6. The method according to claim 1, wherein the image and the reference image are correlated by means of the computing unit, and the first and the second position are determined by means of the computing unit based on a result of the correlation.

7. The method according to claim 1, wherein the first and the second reference structure are defined by the computing unit such that they overlap in the reference image.

8. The method according to claim 1, wherein a raw image depicting the component of the trailer is generated by the camera system, and a polar transform of the raw image is generated to generate the image.

9. The method according to claim 1, wherein the image is generated by the camera system, such that it depicts a tow bar of the trailer as the component of the trailer.

* * * * *